United States Patent [19]

Haerr et al.

[11] Patent Number: 4,673,000
[45] Date of Patent: Jun. 16, 1987

[54] CHECK VALVE ASSEMBLY

[75] Inventors: Timothy A. Haerr, Enon; Donald L. Parker, Middletown, both of Ohio

[73] Assignee: General Motors Corporation, Detroit, Mich.

[21] Appl. No.: 886,657

[22] Filed: Jul. 18, 1986

[51] Int. Cl.$^4$ ............................................. F16K 15/14
[52] U.S. Cl. ..................................... 137/860; 417/511
[58] Field of Search ............... 137/852, 860; 251/900; 417/511

[56] References Cited

U.S. PATENT DOCUMENTS 2,561,009  7/1951  Byers ..................................... 60/589
2,614,793  10/1952  Storm ..................................... 137/860

Primary Examiner—Robert G. Nilson
Attorney, Agent, or Firm—D. D. McGraw

[57] ABSTRACT

An O-ring is received in a groove having only an arcuate portion thereof operative to act as a check valve, with the arcuate portion being movable into a chordal recess so that it does not provide full circumferential sealing engagement in the area of the arcuate portion, allowing fluid pressure or flow therethrough so long as the arcuate portion is so displaced. The resilient character of the O-ring urges the arcuate portion back to the closed position along a tapered ramp surface of the recess into which it was displaced when there is no pressure differential acting across the O-ring. Movement of the O-ring support member relative to a fixed surface normally sealed by the O-ring and net pressure forces on the O-ring may also tend to return the O-ring to the closed position in one direction of movement.

7 Claims, 3 Drawing Figures

CHECK VALVE ASSEMBLY

The invention relates a check valve assembly using an O-ring, and particularly a chordal portion thereof, to control fluid flow. The check valve is particularly adapted for use in a mechanism that already has an O-ring for sealing a piston to a bore. It may also be used as a relief valve, a charging valve, or other appropriate applications for check valves. It will allow fluid flow in one direction but not in the other.

It is known to use an O-ring as a valve in a cylinder bore, as shown in U.S. Pat. No. 2,561,009—Byers et al, entitled "Hydraulic Brake Master Cylinder" and issued July 17, 1951. In that disclosure the piston and cylinder combination has a rubber O-ring which is positioned tightly in sealing position between the piston and the cylinder during the pressure stroke of the piston, but moves to the non-sealing position at the "at rest" position of the piston. The disclosure has a cylinder, a piston slidably mounted in the cylinder, a rubber O-ring carried in a groove surrounding the piston, with one side of the groove having an annular shelf means on which the O-ring rides in sealing relation between the piston and cylinder during the pressure stroke of the piston. The other side of the groove is cut away throughout its circumference so that upon the return stroke of the piston, the O-ring will roll into the non-sealing position, the cylinder having a larger internal diameter adjacent the "at rest" position of the piston to provide greater clearance between the O-ring and the cylinder wall. Usually, the side walls of the groove are formed with apertures therethrough in a direction substantially parallel to the axis of the piston to enhance fluid flow, the apertures in a side wall being covered by the O-ring when it moves against that side wall. The groove in which the O-ring is received is between about one to two times the thickness of the O-ring body, the groove being formed by collars which are either integral with or mounted on the piston. The bottom of the groove adjacent one collar is formed with a cylindrical seat or shelf of an axial length between about one-half and one times the thickness of the O-ring body and of a diameter slightly greater than the inside diameter of the O-ring. Upon the pressure stroke of the piston, the O-ring will roll up on the cylindrical seat or shelf against the side wall of the adjacent collar and will be held out against the inside wall of the cylinder so that the O-ring will seal positively between the piston and the cylinder. The bottom of the groove between the cylindrical seat or shelf and the other collar is cut away throughout its entire circumference to have a circumferentially extending taper so that, upon the return stroke of the piston, the rubber O-ring will roll off the cylindrical or shelf portion and onto the tapered cut-away portion. In that position the rubber O-ring will no longer have sealing engagement with the entire wall of the cylinder. If apertures are provided through the collar, substantially parallel to the axis of the piston, the rubber O-ring will cover the apertures in the collar adjacent the cylindrical seat or shelf of the groove when the O-ring is in the fully sealed position. Similar apertures in the collar adjacent the tapered cut-away section of the groove are also sealed by the O-ring when the O-ring is in the position to permit fluid to flow past its circumference.

Because of the tension in the O-ring in its sealed position on the shelf, it tends to reduce in diameter as it is rolled onto the lesser diameter area into the opened position, contracting about the cut-away section. The resiliency of the O-ring and the tension force therein tends to keep the O-ring in this position and has no tendency to return it to the closed or sealed position. Furthermore, the O-ring must roll or move axially throughout its entire body to shift from the open position to the closed position, and must again do so to shift from the closed position to the opened position. The width of the entire groove between the two collars must be sufficiently great to accommodate this movement of the entire O-ring body.

The check valve assembly embodying the invention herein disclosed and claimed does not require the entire O-ring body to be moved, and particularly to be rolled, as it is changed from the closed position to the opened position and then returns to the closed position. Only an arcuate portion of the O-ring, acting as a valve member, moves out of engagement with the cylinder wall so that fluid passes between the cylinder wall and outer circumference of the O-ring only at such arcuate portion. This movement is a resilient bending type of movement rather than a rolling movement. When in the opened position, the preferable mode of operation is that the inherent tension resiliency of the O-ring tends to move it back to the closed position rather than tending to keep it in the opened position. Even if that tension is not such that it will return the O-ring to the closed position in the disclosed and claimed construction, it does not resist the movement of the entire O-ring body from the open position to the closed position as does the construction in the above noted patent.

Therefore movement of the valve support member of the construction herein disclosed and claimed, independently of or together with the fluid pressure action on the O-ring, does not have to overcome such O-ring tension to roll it from a smaller diameter piston section up and over a larger diameter piston section extending throughout the inner periphery of the O-ring. In the preferred embodiment illustrated, the predominant portion of the O-ring remains in the same diametrically spaced position at all times, with only the relatively small arcuate portion flexing axially and inwardly to provide the open valve function. Furthermore, no change in internal diameter of the cylinder bore or wall is needed to provide the desired check valve function.

The check valve assembly of the invention requires no additional parts in a master cylinder, for example, which already uses an O-ring as a seal. The groove in which the O-ring is fitted does not have to be axially enlarged. The only change is the provision of a chordally extending recess into which an arcuate portion of the O-ring may be moved to open the check valve.

IN THE DRAWING

Figure 1:
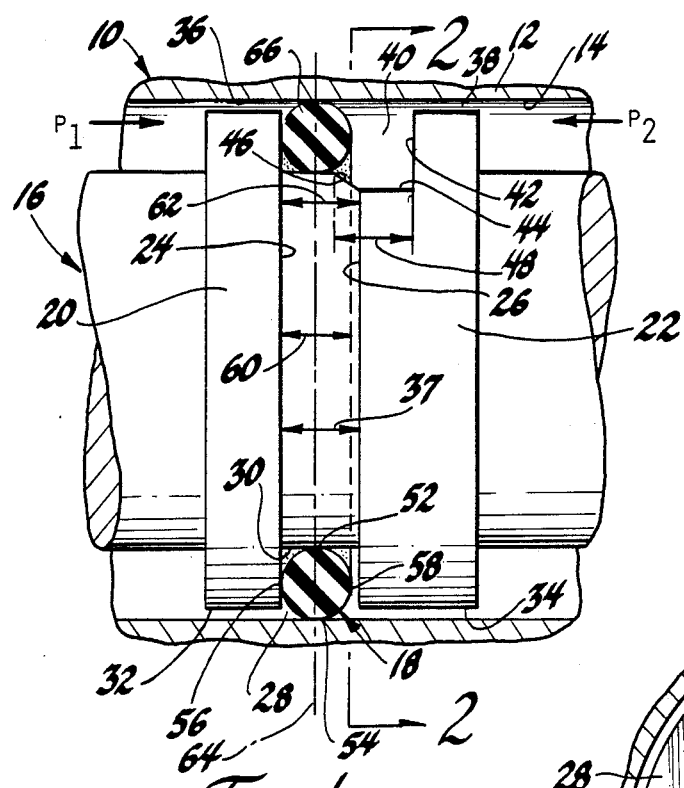
FIG. 1 is a cross-section view, with parts broken away, of a check valve assembly embodying the invention and showing the O-ring valve member in the closed position.

The check valve assembly 10 is illustrated as including a cylinder or body 12 having an inner cylindrical surface 14 formed therein and defining a bore in the body. A valve support member 16, in the form of a piston or the like, is reciprocably received in the bore formed by cylindrical surface 14. An O-ring valve member 18 is mounted on the valve support member as will be further described.

The valve support member 16 is provided with a pair of axially spaced lands 20 and 22 with the facing side surfaces thereof defining the groove side walls 24 and 26 of an annular groove 28. The portion of the valve support member between lands 20 and 22 defines the groove bottom wall 30. The respective outer peripheral surfaces 32 and 34 of lands 20 and 22 are radially spaced inwardly from the cylindrical surface 14 so as to provide clearance spaces 36 and 38 between the outer peripheral surfaces 32 and 34 and the cylindrical surface 14. These clearance spaces provide flow paths for fluid flow past the lands under certain conditions of operation to be described. The width of annular groove 28 is indicated at 37, that width being the axial space between side walls 24 and 26. The depth of the groove 28 is indicated at 39, that depth being the radial distance from the groove bottom wall 30 to the outer peripheral surfaces 32 and 34 of lands 20 and 22.

A chordally formed recess 40 in valve support member 16 intersects chordal portions of groove side wall 26 and groove bottom wall 30 so that the recess 40 primarily exists by removal of a portion of land 34 and a small part of the valve support member which is radially inward of the groove bottom wall 30. Recess 40 has a side wall 42, which is preferably parallel to and axially spaced from the groove side wall 26, and a recess bottom wall 44 which is formed by the portion of the recess extending chordally across a portion of land 22. The part of the recess which intersects the groove bottom wall 30 is formed to provide a tapered ramp surface 46 which extends from the recess bottom wall 44 axially toward land 20 and radially outwardly to the surface of the groove bottom wall 30. The axial width of recess 40 is indicated at 48 and extends axially from the top of the tapered ramp surface 46 to the recess side wall 42.

Figure 2:
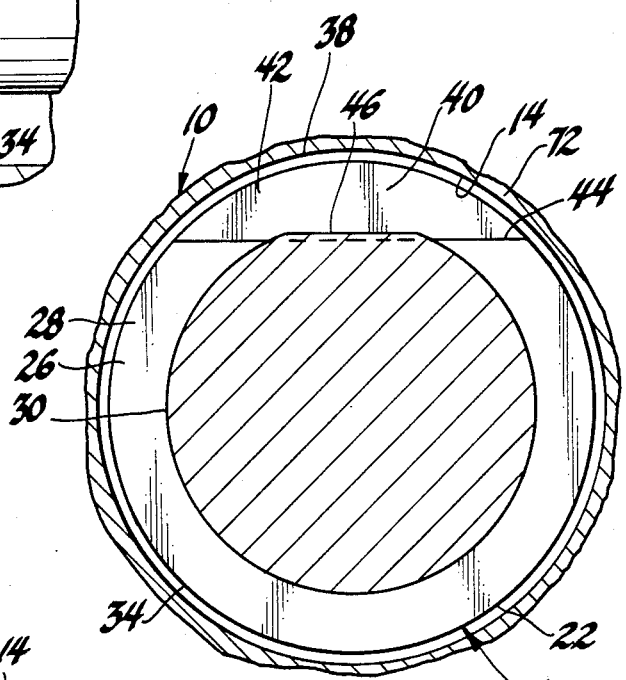
FIG. 2 is a cross-section view taken in the direction of arrows 2—2 of FIG. 1 with parts broken away, illustrating in particular the chordal recess portion of the assembly.

The depth of the recess, indicated at 50, extends radially from the recess bottom wall 44 to the outer peripheral surface 34 of land 22. As is clearly shown in FIG. 2, the recess depth 50 is at its maximum along a radius which bisects recess 40, and decreases as the outer ends of the recess are approached. While it is a simpler manufacture procedure to form recess bottom was 44 and tapered ramp surface 46 as planar surfaces, they may be formed as arcuate surfaces if desired.

Figure 3:
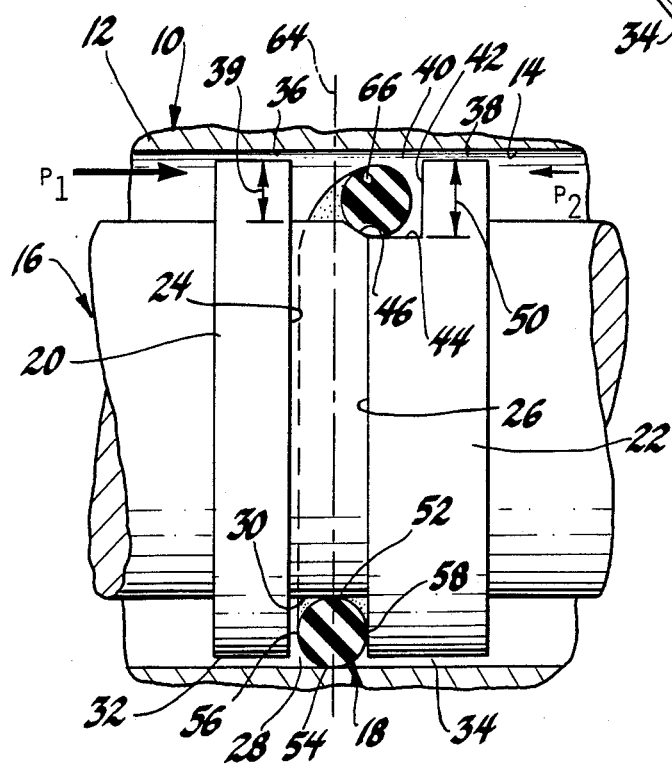
FIG. 3 is a view similar to FIG. 1 but showing the O-ring valve member in the opened position.

The O-ring 18 is annular and is preferably formed so that a cross section of its annular body is circular as is shown in cross section in FIGS. 1 and 3. O-ring 18 has an inner circumferential surface 52 defined by the O-ring internal diameter, an outer circumferential surface 54 determined by the O-ring outer diameter, a side circumferential surface 56 adjacent groove side wall 24, and another side circumferential surface 58 which is adjacent groove wall 26 when the O-ring is installed on the valve support member 16. The free inner diameter of O-ring 18 is slightly less than the diameter of the surface of groove bottom wall 30 so that the O-ring is in tension and engages the groove bottom wall with its inner circumferential surface 52 in sealing relation. The body thickness of the O-ring, indicated at 60, is no greater than the groove width 37 and is preferably slightly less than that groove width. The width of the arcuate portion of the groove bottom wall 30 immediately adjacent the recess tapered ramp surface 46, indicated at 62, is greater than one-half of the body thickness 60 of the O-ring so that when the O-ring side circumferential surface 56 is in circumferential sealing engagement with the groove side wall 24 the O-ring inner circumferential surface 52 is in full circumferential engagement with the groove bottom wall 30 as shown in FIG. 1. In this position of the O-ring 18, the O-ring outer circumferential surface 54 is also in full circumferential sealing engagement with the cylindrical surface 14 of cylinder body 12. Therefore the O-ring is positioned in a plane 64 which extends through the areas of sealing engagement of the O-ring with the cylindrical surface 14 and the groove bottom wall 30. Plane 64 extends transversely of the valve support member 16 and passes through that member axially between the groove side wall 24 and the point where the recess tapered ramp surface 46 meets the groove bottom wall 30. When the entire O-ring body is in plane 64 as shown in FIG. 1, the O-ring circumferentially seals the bore, defined by cylindrical surface 14 and containing valve support member 16, against fluid pressure and fluid flow passing from one axial side of the O-ring to the other.

For descriptive purposes, fluid pressure $P_1$ is considered to exist on the side of the O-ring on which land 20 is located, and fluid pressure $P_2$ is considered to exist on the axially opposite side of the O-ring as indicated in FIGS. 1 and 3. With the O-ring in this closed valve and sealed position, it can be seen that an arcuate portion 66 of the O-ring is capable of being sealingly supported by groove side wall 24, as is the remaining portion of the O-ring, while the arcuate portion 66 faces the recess 40 and therefore is not capable of having sealing support provided thereto by the groove side wall 26 since that groove side wall has been cut away to form the recess 40. However, the body of the O-ring, except for the arcuate portion 66, is capable of being sealingly supported by groove side wall 26 when the side circumferential surface 58 of the O-ring engages that groove side wall.

The closed check valve condition illustrated in FIG. 1 is the normal condition of the valve assembly 10. In this condition, pressure $P_2$ is equal to or greater than pressure $P_1$, with pressure $P_2$ acting on the axial side surface 58 of O-ring 18 to urge the O-ring to the position shown in FIG. 1. If the O-ring is already in that position and the pressures $P_1$ and $P_2$ are equal, or do not exist, the O-ring will retain this position. Furthermore, axial movement of valve support member 16 in cylinder body 12 to the right as shown in FIG. 1 will also tend to retain the O-ring in this position because of its sealing engagement with cylindrical surface 14.

If the valve support member 16 is moved leftwardly, even without any differential between pressures $P_1$ and $P_2$, the O-ring and its plane 64 will tend to move axially toward groove side wall 26. However, in the absence of a pressure differential in which $P_1$ is the greater pressure, the O-ring will remain in sealing engagement with the cylindrical surface 14 at its outer circumferential surface 54 and with groove bottom wall 30 at its inner circumferential surface 52. This is true because the difference between groove width 37 and the width 62 of a portion of the groove bottom wall 30 is less than one-half the body thickness 60 of the O-ring so that the inner peripheral surface 52 of the O-ring will continue to be in sealing engagement with the groove bottom wall 30 in plane 64.

When pressure $P_1$ becomes greater than pressure $P_2$, it acts on the axial side of O-ring 18 adjacent groove side wall 24, to further assist in moving the O-ring toward sealing contact with groove side wall 26. Since the groove side wall 26 cannot provide sealing support for the arcuate portions 66 of the O-ring, the higher pressure $P_1$ will act on that O-ring arcuate portion against the resilient tendency of the O-ring to remain in its plane 64, causing the O-ring arcuate portion 66 to bend over into recess 40 and engage the recess tapered ramp surface 46 as shown in FIG. 3. Since the recess depth 50 is at least as great as a body thickness of the O-ring, the O-ring arcuate portions 66 moves into the recess so that its outer peripheral surface 54 moves radially inwardly from cylindrical surface 14 and is no longer in sealing engagement with that surface. This opens the check valve, allowing fluid flow from the higher pressure side where pressure $P_1$ is located to the lower pressure side $P_2$ is located. This is illustrated in FIG. 3. It is noted that it is only the relatively small arcuate portion of the O-ring that disengages cylindrical surface 14, and not the entire O-ring. The O-ring arcuate portion 66 may move axially as it moves radially inward in a bending action sufficiently far for it to engage the recess side wall 42. However, this is not required for the valve to function. When pressure $P_1$ is equal to or less than pressure $P_2$, the additional resilient tension in the O-ring due to the deformation of the arcuate portion 66 into recess 40 tends to pull the O-ring back to the position shown in FIG. 1, and the recessed tapered ramps surface 46 permits this action. It is therefore desirable to have the O-ring arcuate portion 66 to be able to return to the closed position shown in FIG. 1 due to the resilient tension in the O-ring itself. Movement of the valve support member 16 rightwardly as shown in FIG. 3 may further assist in returning the valve to the closed condition shown in FIG. 1. Any pressure differential in which $P_2$ is slightly greater than $P_1$ will further act on the O-ring to assist in returning it to the fully closed position so that its entire body is located in the position indicated by plane 64 as shown in FIG. 1.

It can be seen that a typical O-ring seal construction need only be provided with the appropriate recess 40 to incorporate it as a check valve assembly as well as a seal assembly, without any additional parts. When open, the check valve assembly will allow pressure and fluid flow therethrough rightwardly as seen in FIG. 3, but will close to prevent such pressure and flow leftwardly as seen in FIGS. 1 and 3.

The embodiments of the invention in which an exclusive property or privilege is claimed are defined as follows:

1. A check valve comprising a resilient rubber-like O-ring having inner and outer and first and second side circumference surfaces and defining a valve member, a valve support member having an annular groove therein in which said O-ring is received, and a cylindrical surface radially spaced from said valve support member to provide a fluid flow path therebetween under control of said check valve, said cylindrical surface being sealingly engaged by one of said O-ring inner and outer circumference surfaces concentrically of said annular groove, said annular groove having axially spaced first and second side walls and a bottom wall with said O-ring in full circumferential sealing engagement with at least one of said walls and with said cylindrical surface when said check valve is in the closed position, the resilient character of said O-ring providing force continually urging said O-ring to the check valve closed position, said first side wall being positioned to provide sealing support for said O-ring throughout its first side circumference surface when said O-ring is in sealing engagement with said first side wall, said second side wall having an arcuate portion thereof recessed axially and radially inwardly to be able to provide no sealing support for only an arcuate portion of said O-ring when said O-ring is positioned to otherwise have said O-ring second side circumference surface sealingly supported by said second side wall, and means moving said O-ring arcuate portion into said second side wall recessed portion and away from sealing engagement with said cylindrical surface against said resilient-character-urging force to open said check valve and permit fluid flow past said O-ring arcuate portion between said valve support member and said cylindrical surface, said resilient-character-urging force of said O-ring returning said O-ring arcuate portion to the check valve closed position when said moving means no longer acts on said O-ring arcuate portion in the valve opening direction.

2. A check valve comprising a resilient rubber-like O-ring having inner and outer and first and second side circumference surfaces and defining a valve member, a valve support member having an annular groove therein in which said O-ring is received, and a cylindrical surface radially spaced from said valve support member to provide a fluid flow path therebetween under control of said check valve, said cylindrical surface being engaged by one of said O-ring inner and outer circumference surfaces concentrically of said annular groove, said annular groove having axially spaced first and second side walls and a bottom wall with at least two of said O-ring circumference surfaces respectively being in full circumferential sealing engagement with at least said groove bottom wall and said cylindrical surface when said check valve is in the closed position, the resilient character of said O-ring providing force continually urging said O-ring to the check valve closed position, said second side wall and a portion of said bottom wall immediately adjacent said second side wall cooperatively having a chordal portion thereof removed axially and radially to provide a chordal recess able to provide no sealing support for only an arcuate portion of said O-ring when said O-ring is positioned to otherwise have said second side circumference surface thereof sealingly supported by said second side wall and the other of said inner and outer circumference surfaces thereof sealingly supported by said portion of said bottom wall, and means moving said O-ring arcuate portion into said chordal recess and away from sealing engagement with said cylindrical surface against said resilient-character-urging force to open said check valve and permit fluid flow past said O-ring arcuate portion between said valve support member and said cylindrical surface, said resilient-character-urging force of said O-ring returning said O-ring arcuate portion to the check valve closed position when said moving means no longer acts on said O-ring arcuate portion in the valve opening direction.

3. A check valve comprising:
 a cylinder having an inner cylinder wall, a valve support member received in said cylinder and a resilient rubber-like O-ring valve member on said valve support member;
 said valve support member having first and second lands of lesser diameter than the outer diameter of said O-ring valve member, said lands being spaced axially apart to form a groove having sides defined by said lands and a bottom having a diameter greater than the inner diameter of said O-ring valve member with the width of said groove defined by said sides being greater than the axial thickness of said O-ring valve member, said O-ring valve member being received in said groove and being in engagement with said inner cylinder wall and said groove bottom;

and a chordally formed recess in said valve support member intersecting a portion of said second land and a portion of said groove and a portion of said groove bottom so as to provide a tapered ramp surface connecting said groove bottom to the bottom of said recess;

said O-ring valve member having a closed position sealingly engaging said groove bottom and said inner cylinder wall and an open position engaging said groove bottom and said inner cylinder wall, said O-ring valve member when in said open position having only a chordal portion thereof displaced into said chordally formed recess and spaced radially inwardly from said inner cylinder wall to permit fluid flow therepast in the area of said chordally formed recess and O-ring valve member chordal portion.

4. A check valve comprising:

a cylinder having an inner cylinder wall, a valve support member received in said cylinder and a resilient rubber-like O-ring valve member on said valve support member;

said valve support member having first and second lands of lesser diameter than the outer diameter of said O-ring valve member, said lands being spaced axially apart to form a groove having sides defined by said lands and a bottom having a diameter greater than the inner diameter of said O-ring valve member with the width of said groove defined by said sides being greater than the axial thickness of said O-ring valve member, said O-ring valve member being received in said groove and being in engagement with said inner cylinder wall and said groove bottom;

and a chordally formed recess in said valve support member intersecting a portion of said second land and a portion of said groove and a portion of said groove bottom so as to provide a tapered ramp surface connecting said groove bottom to the bottom of said recess, said recess having a width greater than half the axial thickness of said O-ring valve member;

said O-ring valve member having a closed position sealingly engaging said groove bottom and said inner cylinder wall in a plane passing transversely through said groove bottom, said O-ring valve member having an open position engaging said groove bottom and said inner cylinder wall, said O-ring valve member when in said open position having a chordal portion resiliently deformed and displaced out of said plane axially and radially into said chordally formed recess and spaced radially from said inner cylinder wall to permit fluid flow therepast in the area of said chordally formed recess and O-ring valve member chordal portion.

5. A check valve comprising:

a cylinder having an inner cylinder wall and adapted to selectively have fluid flow therethrough in one direction and no fluid flow in the other direction, a valve support member received in said cylinder and subject to reciprocal axial movements relative thereto, and a resilient rubber-like O-ring valve member on said valve support member;

said valve support member having first and second lands of lesser diameter than the outer diameter of said O-ring valve member, said lands being spaced axially apart to form a groove having sides defined by said lands and a bottom having a diameter greater than the inner diameter of said O-ring valve member with the width of said groove defined by said sides being greater than the axial thickness of said O-ring valve member, said O-ring valve member being received in said groove and being in engagement with said inner cylinder wall and said groove bottom;

and a chordally formed recess in said valve support member intersecting an arcuate portion of said second land and an arcuate portion of said groove, said chordally formed recess also intersecting an arcuate portion of said groove bottom so as to provide a tapered ramp surface connecting said groove bottom to the bottom of said recess;

said O-ring valve member having a closed position sealingly engaging said groove bottom and said inner cylinder wall and an open position engaging said groove bottom and said inner cylinder wall, said O-ring valve member when in said open position having a chordal portion displaced axially and radially inwardly into said chordally formed recess so as to be spaced radially inwardly from said inner cylinder wall to permit fluid flow therepast in the area of said chordally formed recess and O-ring valve member chordal portion;

the reversal of direction of relative axial movement of said valve support member in said cylinder and relative movement thereof in the reversed direction acting on said O-ring valve member in cooperation with the engagement of said O-ring valve member with said inner cylinder wall and fluid pressure acting on one side of said O-ring valve member to move said O-ring valve member from the closed position to the open position in one direction of valve support member relative movement and from the open position to the closed position in the other direction of valve support member relative movement.

6. A check valve comprising:

a cylinder having an inner cylinder wall and adapted to selectively have fluid flow therethrough in one direction and no fluid flow in the other direction, a valve support member received in said cylinder for axial relative movement, and a resilient rubber-like O-ring valve member on said valve support member;

said valve support member having first and second lands of lesser diameter than the outer diameter of said O-ring valve member, said lands being spaced axially apart to form a groove having sides defined by said lands and a bottom having a diameter greater than the inner diameter of said O-ring valve member with the width of said groove defined by said sides being greater than the axial thickness of said O-ring valve member, said O-ring valve member being received in said groove and being in engagement with said inner cylinder wall and said groove bottom;

and a chordally formed recess in said valve support member intersecting a portion of said second land and a portion of said groove and a portion of said groove bottom so as to provide a tapered ramp surface connecting said groove bottom to the bottom of said recess, said recess having a width greater than half the axial thickness of said O-ring valve member;

said O-ring valve member having a closed position sealingly engaging said groove bottom and said inner cylinder wall and an open position engaging said groove bottom and said inner cylinder wall, said O-ring valve member when in said open position having a chordal portion thereof displaced into said chordally formed recess and spaced radially inwardly from said inner cylinder wall to permit fluid flow therepast in the area of said chordally formed recess and O-ring valve member chordal portion;

the reversal of direction of relative axial movement of said valve support member in said cylinder and relative movement thereof in the reversed direction acting on said O-ring valve member in cooperation with the engagement of said O-ring valve member with said inner cylinder wall and fluid pressure acting on one side of said O-ring valve member to move said O-ring valve member from the closed position to the open position in one direction of valve support member relative movement and from the open position to the closed position in the other direction of valve support member relative movement, said O-ring valve member when in the open position having a spring-like bias due to the inherent resiliency thereof urging said O-ring valve member chordal portion toward the closed position and acting upon initial relative movement of said valve support member in the direction tending to move said O-ring valve member to the closed position to snap said O-ring valve member chordal portion into the closed position.

7. An O-ring seal and check valve assembly comprising:

a cylinder having an inner cylinder wall and adapted to selectively have fluid flow therethrough in one direction and no fluid flow in the other direction, a valve support member received in said cylinder, and a resilient rubber-like circular cross section annular body on said valve support member defining an O-ring seal and valve member;

said valve support member having first and second lands of lesser diameter than the outer diameter of said O-ring seal and valve member so as to permit fluid flow between said lands and said inner cylinder wall under control of said O-ring seal and valve member, said lands being spaced axially apart to form a groove having sides defined by said lands and a bottom having a diameter greater than the inner diameter of said O-ring seal and valve member with the width of said groove defined by said sides being greater than the circular cross section thickness of said O-ring seal and valve member, said O-ring seal and valve member being received in said groove;

and a chordally formed recess in said valve support member intersecting a portion of said second land and a portion of said groove and a portion of said groove bottom so as to provide a tapered ramp surface connecting said groove bottom to the bottom of said recess, said recess having a width greater than half the circular cross section thickness of said O-ring seal and valve member and a depth at least as great as the circular cross section thickness of said O-ring seal and valve member;

said O-ring seal and valve member having a closed position sealingly engaging said groove bottom and said inner cylinder wall and an open position engaging said groove bottom and said inner cylinder wall with said O-ring seal and valve member having a chordal portion thereof displaced axially and radially into said chordally formed recess and spaced radially inwardly from said inner cylinder wall to permit fluid flow therepast in the area of said chordally formed recess and O-ring seal and valve member chordal portion;

said O-ring seal and valve member when in the open position having a spring-like bias due to the inherent resiliency thereof urging said O-ring seal and valve member chordal portion toward the closed position, said O-ring seal and valve member chordal portion responding upon the impression of a predetermined minimum fluid pressure differential biased toward said recess side of said O-ring seal and valve member chordal portion to be moved to said open position against said spring-like bias and acting upon the decrease of said fluid pressure differential below the predetermined minimum to return to said closed position.

* * * * *